(12) United States Patent
Beynon et al.

(10) Patent No.: US 7,478,135 B1
(45) Date of Patent: Jan. 13, 2009

(54) ONE-RESPONDER EMAIL FEATURE

(75) Inventors: Margaret Ann Ruth Beynon, Coventry (GB); Andrew H. Murphy, Southampton (GB); Edward J. Slattery, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/057,575

(22) Filed: Mar. 28, 2008

(51) Int. Cl.
*G06F 13/00* (2006.01)

(52) U.S. Cl. .................. 709/206; 709/204; 709/205; 715/758; 715/759; 434/352

(58) Field of Classification Search ......... 709/204–207; 715/753–759; 370/260–269; 434/350–352
See application file for complete search history.

(56) References Cited

U.S. PATENT DOCUMENTS

| | | | |
|---|---|---|---|
| 6,493,675 | B1 | 12/2002 | Kanaya et al. |
| 6,898,435 | B2 | 5/2005 | Milman |
| 7,328,249 | B2 | 2/2008 | Morrow et al. |
| 2002/0103691 | A1 | 8/2002 | Smith |
| 2002/0123911 | A1 | 9/2002 | Bjerre et al. |
| 2003/0135565 | A1 | 7/2003 | Estrada |
| 2004/0230662 | A1 | 11/2004 | Estrada et al. |
| 2005/0027803 | A1 | 2/2005 | Kelley et al. |
| 2005/0223070 | A1 | 10/2005 | Ordille et al. |
| 2005/0240655 | A1 | 10/2005 | Lipton et al. |
| 2006/0069599 | A1 | 3/2006 | Hatoun et al. |
| 2006/0075043 | A1 | 4/2006 | Chen et al. |
| 2006/0277263 | A1 * | 12/2006 | Daniels et al. .............. 709/206 |
| 2007/0027730 | A1 | 2/2007 | McArdle |
| 2008/0091782 | A1 | 4/2008 | Jakobson |
| 2008/0140793 | A1 | 6/2008 | Ouchi |

FOREIGN PATENT DOCUMENTS

| EP | 1473649 | 11/2004 |
|---|---|---|
| WO | WO 2007125427 | 11/2007 |

OTHER PUBLICATIONS

Division of Los Alamos National Laboratory Selects Footprints for Web Based Support and Workflow Automation for Multiple Departments; ESA Division Uses Footprints to Centralize Help Desk Activities, Deliver Self Service to Employees and Automate Task Management via the Web, PR Newswire, PHTU01511032003, Mar. 11, 2003.
Peregrine Systems: Automatic IT Problems Alerting and Response Easier Worldwide, Round the Clock Support, M2 Presswire, Aug. 11, 1998.

* cited by examiner

*Primary Examiner*—Kenneth R Coulter
(74) *Attorney, Agent, or Firm*—Oppenheimer Wolff & Donnelly LLP; Robert M. Himing

(57) ABSTRACT

The present invention discloses a method for allowing an email request to be sent to a group of recipients which requires one person to accept the request or task. Obtaining notification of the acceptance and completion status of the task is accomplished solely through exchanged emails, without the use of standalone tracking or modification to the underlying email system functionality. One responder emails are sent to a group of recipients, and when an accepting recipient accepts the request, the sender and non-accepting recipients are notified via email that the request has been accepted. Similarly, emails can be sent to the sender and non-accepting recipients that the request has been completed.

1 Claim, 3 Drawing Sheets

ONE-RESPONDER EMAIL FEATURE

FIELD OF THE INVENTION

The present invention generally relates to computer systems using a network-connected email system. The present invention specifically relates to a method of initiating a one-responder feature in messages deployed within an email system.

BACKGROUND OF THE INVENTION

Email applications are commonly used to communicate messages between a sender and one or more individuals. One type of email message which is commonly sent is that containing a task request, where any one person in a group of recipients is requested to perform certain actions. For example, a message may be sent to a group of system administrators with a critical request to fix a problem on a particular system. Any one of the group is able to fix the problem, but only one person is needed undertake the task, and each person is not necessarily available to undertake the task. Further, the task request may be time sensitive. Thus, there exists a need to timely inform each recipient about the task, and prevent multiple users from accepting the task and duplicating work.

Email messaging may be used to notify a group of persons when one person signs up for or undertakes the task. However, the individual who has decided to complete the task must often reply to the entire email recipient list and notify each recipient that the task has been undertaken or completed. This involves the exchange of numerous email messages, often to people who were unaware of or unable to execute the task.

One workaround for this problem is through the use of a method which assigns tasks according to a priority email address list. In this scenario, messages are first sent to the users most capable or most likely to complete the task, and if the user is unable to undertake the task, the next person in the priority list is contacted. Although this system is able to prevent duplicated work, this method of communication may take a large amount of time to operate, and is relatively inefficient.

What is needed in the art is a way to communicate to a group of recipients regarding a task and the status of the task via email in parallel, rather than sequential, fashion.

BRIEF SUMMARY OF THE INVENTION

The present invention provides a new and unique method for implementing a one-responder email feature. In one embodiment of the present invention, an email client program is used to send an email message containing a "one responder" request, i.e., an email message requiring one person to complete the task or request within the email message.

The one-responder email message is first sent using the email client program from a person who originates or assigns the task to a group of recipients. The email originator uses the email client to flag the message as "one-recipient required", which asks that only one person in the group respond to a specified request or task described in the email message.

Each recipient receives the email message, and an option is displayed in the recipient's email client to accept the request. When a user accepts the request, an email is sent from the accepting user's email client to the others in the group of recipients who did not accept the request. This email message notifies others that the accepting user has accepted the request. Also, the non-accepting recipients' email client will no longer allow another person to accept the request, and will instead display a message notifying the non-accepting recipients that the request has been accepted.

In a further embodiment of the present invention, after the accepting user selects the accept option, the accept option is replaced by a complete option within the accepting user's email client. When the request or task has been completed, the accepting user can select the complete option, and an email is sent from the accepting/completing user's email client to the others in the group of recipients that the task is complete. Accordingly, the other recipients' email client will display a message notifying the non-accepting (and non-completing) recipients that the request has been completed by the accepting/completing user.

The status of acceptance and completion is tracked only through the exchange of emails, so no notification or tracking occurs outside of email messages. Thus, no external processes or databases are used to track or manage the status of the request. Updating the request status and accepting or completing the request is facilitated solely through the exchange of email messages.

DETAILED DESCRIPTION OF THE INVENTION

One aspect of the present invention relates to communicating with a group of individuals through a "one responder" email. This email is particularly useful to broadcast the need for one person to perform some task-related request. This request may be, for example, a problem needing quick resolution or a specialized task which needs to be completed by one of a predetermined group of individuals. A further aspect of the present invention involves identifying and communicating when one of the individuals takes ownership of the request (i.e., agrees to perform the task) and completes the request.

In response to an individual accepting ownership of the request, a further communication is made to each of the other individuals to inform them that the event is now "owned" or will be undertaken by the individual who accepted. In this way, a problem can be communicated to a group of persons simultaneously, while preventing multiple persons from working on the problem in parallel when the system identifies that one of the people has agreed to address the problem.

A further aspect of the present invention relates to the operation of a method deploying a one-responder email message in a typical email system. The only requirement of the email system is that it must be capable of sending messages to persons who might be able to fix the problem, and capable of sending a message to non-accepting persons when one person agrees to take on or complete the issue. The application of the present invention is expandable to instant messaging, text messaging, pager messages, or any other type of communication system that utilizes messages.

One embodiment of the present invention enables extending a generic email system with a kind of "communal to-do" workflow manager communication through email. This embodiment is implemented through the use of email settings and flags, as part of the normal use of messaging features in existing email systems. This is distinguished from a task management system that is designed to specifically assign and manage "tasks" or "events". Rather, the present invention may operate as an enhancement to existing email systems, such as through a plugin or software add-in to existing email system software, without compromising the function of the existing system.

Figure 1A:
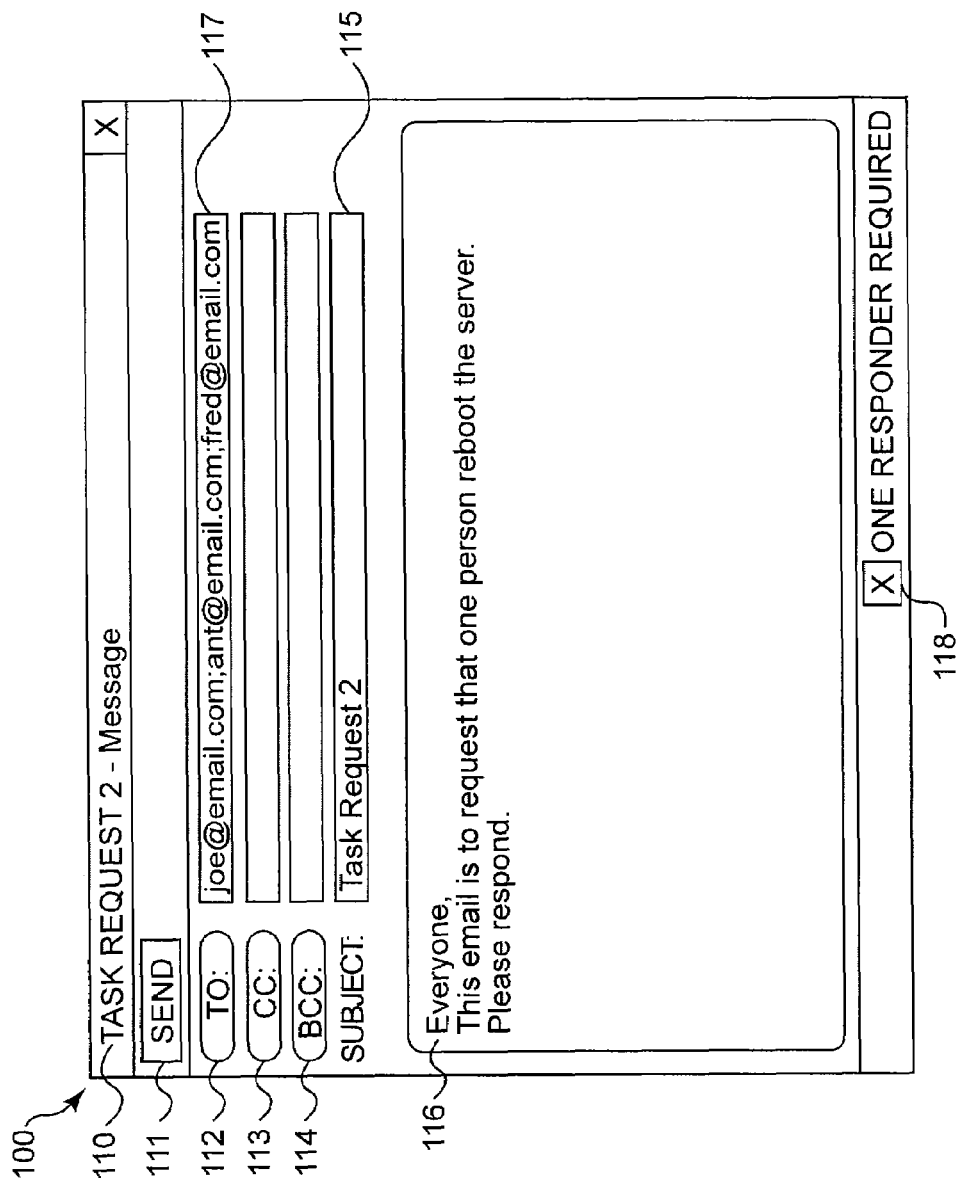
FIG. 1 illustrates an example email messaging system and interface for sending an one responder email in accordance with one embodiment of the present invention.

FIG. 1A depicts an example email messaging interface capable of sending a one-responder email in accordance with one embodiment of the present invention. A new message window 100 is displayed within an email client, configured to allow a user to compose and send an email. As one skilled in the art would appreciate, this new message window 100 and the email client could be implemented in numerous ways— for example, as a standalone software program, a window within another software program, a web-based interface, etc.

The new message window contains a send button 111, TO:, CC:, and BCC: fields 112-114, a subject line input field 115, and a message body input field 116. The new message window in FIG. 1A is depicted as addressing a new email message to recipients 117 joe@(email.com, ant@email.com, and friend@email.com. The message body input 116 is further depicted as including text of a specific request to be performed by one of the recipients.

To support the designation of a one-responder email message, the email messaging interface may be modified with a basic enhancement to the email client. One implementation is depicted in the "one responder required" selection box 118 of FIG. 1A. The email client display a selection box as part of a selectable email option when a new message is composed or sent. If this "one-responder required" option is selected for a message, the email would be broadcast to each recipient on the specified recipient list 117, with unique identifier and a flag or marking within the email message set to say this is a one-responder email. The unique identifier may be used to distinguish between several one-responder emails in circulation at one time. Later, each recipient's email client would automatically insert and display an ability to accept the request specified in the email message.

Figure 1B:
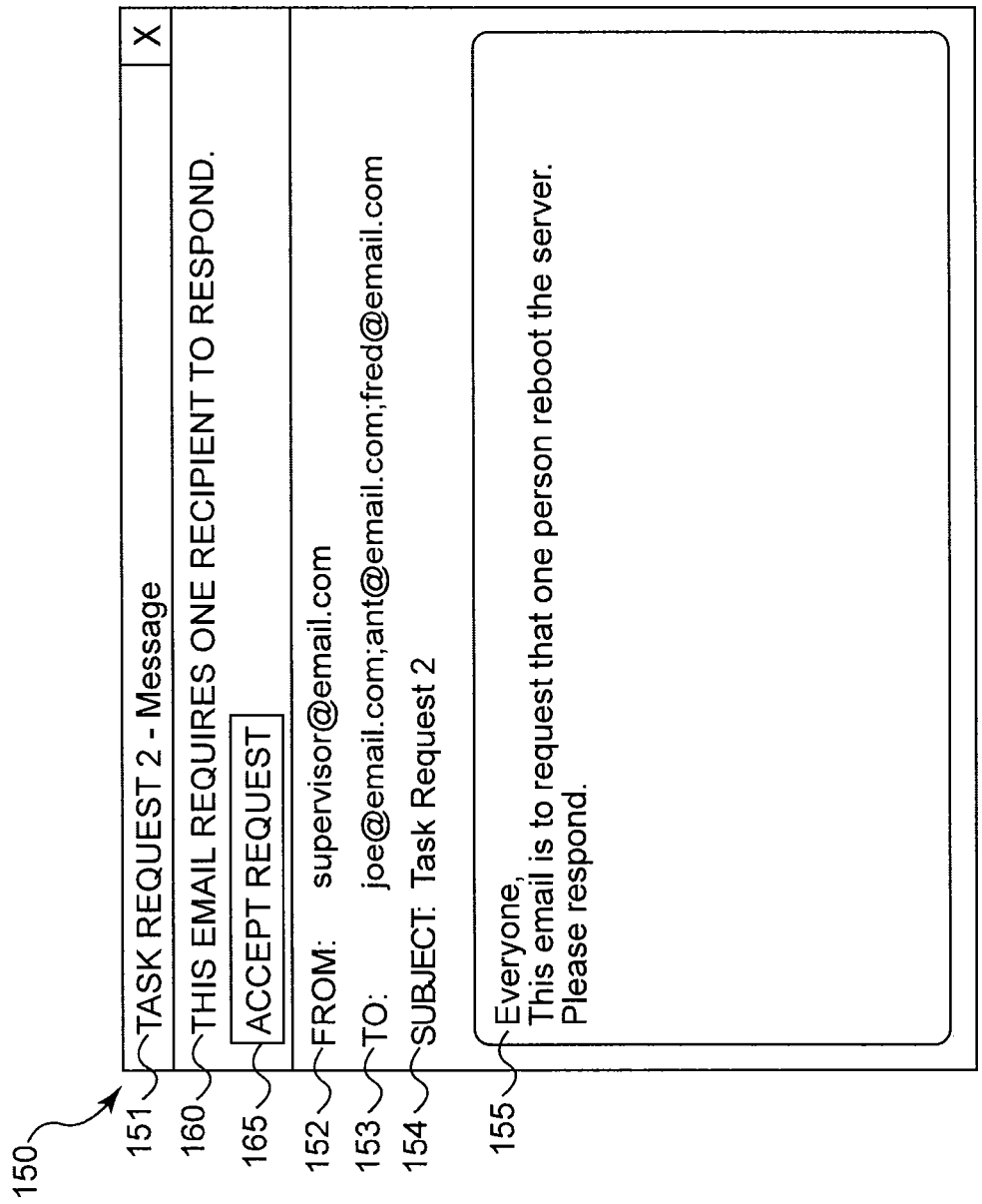

FIG. 1B depicts an example email messaging interface capable of displaying and responding to a one-responder email message in accordance with one embodiment of the present invention. As depicted, email message 150 received by a recipient contains a title 151, From:, To:, and Subject: lines 152-154, and a message body 155 detailing the email request. As depicted, the recipient is notified in the window that the message was one-responder required 160. To accept the request, the accepting email recipient would select the Accept button 165 or similar option, which returns an "accept" email notification to the original sender. The accept email contains a unique identifier and the identity of the acceptor. This acceptance would also automatically trigger a "cancel" email to everyone on the recipient list except the acceptor. The cancel email message would be matched with the original message via the unique identifier and the overlay done within the email application.

In this embodiment, all participants are informed simultaneously, so that when each person opens the email, each is presented with an "accept" option. When one user selects the accept option, then all others are emailed automatically with the "cancellation" email. This cancellation email would not actually be displayed as a new email in an inbox, but instead would immediately overlay the original email with a flag such as "This task is being taken care of by name of the person who clicked Accept". If two people click accept, then the second accepting user will be provided with notification, e.g., "This email has already been accepted by name of the person who clicked Accept".

In a further embodiment of the present invention, an enhancement to this system changes the Accept button to a Complete button automatically when the Accept button is selected. Later, when the accepting user selects the "Complete" button, then all others are mailed automatically with a similar "complete" email notification. Again, this complete email would not actually be displayed as a new email, but instead would immediately overlay the original email with a flag or designation such as "This request has been completed by name of the person who clicked Complete."

Figure 2:
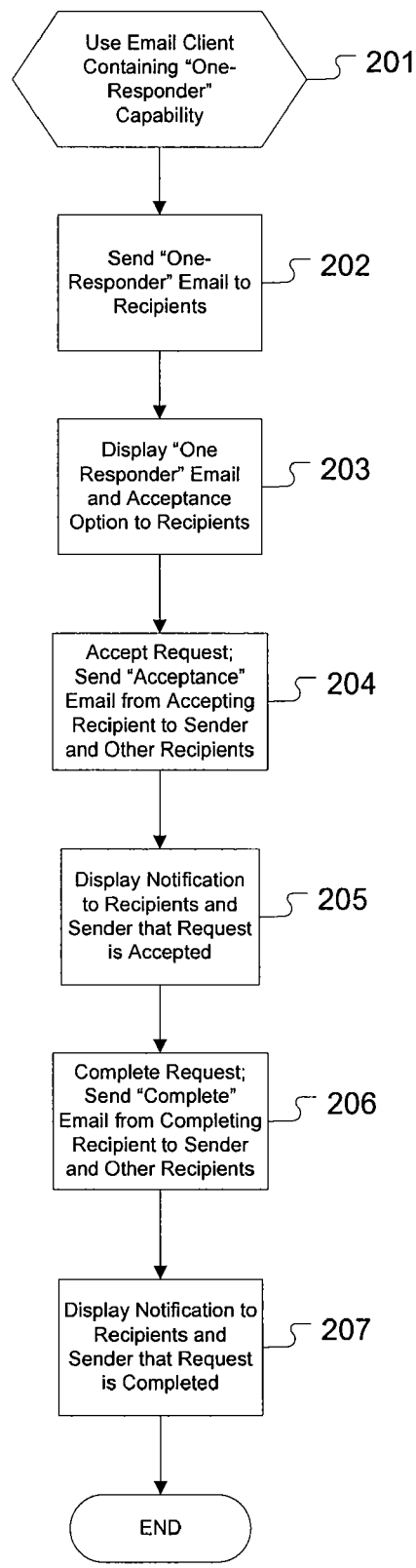
FIG. 2 illustrates an example operation of the method for communicating a one-responder email in accordance with one embodiment of the present invention.

FIG. 2 depicts a workflow for a method of communicating a one-responder email in accordance with one embodiment of the present invention. The steps for this method are as follows:

1. Step 201: An email client is used which connects to an email server over a network. This email client contains specialized capability for marking and processing one-responder emails.

2. Step 202: A task originator sends an email message within the email client program from a sender to a group of recipients. This email message is flagged as requiring one recipient to respond to a request within the email message.

3. Step 203: When the email is received by each of the recipients, an indicator is displayed which notifies the users that one recipient is requested to respond to the request. Each of the group of recipients is displayed with an ability to accept the request.

4. Step 204: The accepting user accepts the request. An email message is sent from the accepting recipient who accepts the request to each of the group of recipients who have not accepted the request. This acceptance email notifies the sender and the other recipients the accepting recipient has accepted the request.

5. Step 205: Notification is displayed to each of the non-accepting recipients that the task has been accepted by the accepting recipient. As discussed above, the notification of request acceptance is accomplished by email messages received within the email client of the sender and each recipient.

6. Step 206: A complete email message is sent from the accepting/completing recipient to each of the non-accepting recipients and original sender when the accepting/completing recipient marks the request as complete. This email contains notification that the request has been completed.

7. Step 207: Notification is displayed to the sender and each recipient that the task has been completed by the accepting/completing recipient. As discussed above, the notification of request completion is accomplished by email messages received within the email client of the sender and each recipient.

The embodiments described above are not the only possible implementation of an one-responder email feature within an email system. The detailed solution for each email system would necessarily depend on the design of that system. The present invention may even be implemented in a custom software application, just performing the one-responder function, or may be implemented as a function added to a completely different software application.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for allowing one user to respond to a task request sent in an email, comprising:

sending a request email message within an email client connected to an email server over a network from an originator to a group of recipients, wherein the email client enables the request email message to be flagged as requiring one recipient to respond to a task request within the request email message;

displaying to each of the group of recipients the request email message, including presenting an option for each of the group of recipients to accept the task request within an email client operated by each of the recipients;

sending an acceptance email message from an accepting recipient who accepts the task request to the originator and each of the group of recipients who have not accepted the task request responsive to the accepting recipient accepting the task request within the email client operated by the accepting recipient, the acceptance email message containing identification of the task request and notification that the task request has been accepted;

displaying notification to the originator and each of the group of recipients who have not accepted the task request that the task request has been accepted by the accepting recipient after the task request is accepted;

sending an completion email message from the accepting recipient to the originator and each of the group of recipients who have not accepted the task request responsive to the accepting recipient marking the task request as complete within the email client operated by the accepting recipient, the completion email message containing identification of the task request and notification that the accepting recipient has completed the task request; and displaying notification to the originator and each of the group of recipients that the task request has been completed after the task request is marked as completed;

wherein a status of task request acceptance is tracked solely by the acceptance email message and a status of task request completion is tracked solely by the completion email message received within the email clients operated by the originator and each of the group of recipients; and wherein the option presented to each of the group of recipients to accept the task request within the email clients operated by each of the group of recipients is automatically removed responsive to the acceptance email message being received from the accepting recipient.

* * * * *